(12) United States Patent
Ye et al.

(10) Patent No.: US 10,184,223 B2
(45) Date of Patent: Jan. 22, 2019

(54) PREFABRICATED BAMBOO COMPOSITE UTILITY TUNNEL

(71) Applicants: ZHEJIANG XINZHOU BAMBOO-BASED COMPOSITES TECHNOLOGY CO., LTD., Hangzhou (CN); Ling Ye, Huzhou (CN)

(72) Inventors: Ling Ye, Huzhou (CN); Xin Zhu, Huzhou (CN); Lin Niu, Huzhou (CN)

(73) Assignees: ZHEJIANG XINZHOU BAMBOO-BASED COMPOSITES TECHNOLOGY CO., LTD., Hangzhou (CN); Ling Ye, Huzhou (CN)

( * ) Notice: Subject to any disclaimer, the term of this patent is extended or adjusted under 35 U.S.C. 154(b) by 0 days.

(21) Appl. No.: 15/786,572

(22) Filed: Oct. 17, 2017

(65) Prior Publication Data

US 2018/0051437 A1 Feb. 22, 2018

Related U.S. Application Data

(63) Continuation-in-part of application No. PCT/CN2016/090573, filed on Jul. 20, 2016.

(30) Foreign Application Priority Data

Sep. 8, 2015 (CN) .................... 2015 2 0689829 U

(51) Int. Cl.
*E21D 5/11* (2006.01)
*E21D 11/04* (2006.01)
(Continued)

(52) U.S. Cl.
CPC ............... *E02D 29/10* (2013.01); *E21D 5/11* (2013.01); *E21D 11/04* (2013.01); *F16L 9/16* (2013.01);
(Continued)

(58) Field of Classification Search
CPC .. E21D 5/00; E21D 5/012; E21D 5/11; E21D 5/02; E21D 11/00; E21D 11/003; E21D 11/04; E21D 11/152; E21D 11/155
(Continued)

(56) References Cited

U.S. PATENT DOCUMENTS 9,903,513 B2 * 2/2018 Zhu ........................ F16L 9/14
2005/0271475 A1 12/2005 Ballesteros

FOREIGN PATENT DOCUMENTS

CA 2927542 A1 * 5/2015 ............... F16L 9/14
CN 2607503 Y 3/2004
(Continued)

*Primary Examiner* — Frederick L Lagman
(74) *Attorney, Agent, or Firm* — Matthias Scholl P.C.; Matthias Scholl

(57) ABSTRACT

A composite utility tunnel including a plurality of prefabricated tunnel units which are connected to one another. Each tunnel unit includes a tunnel body and a support component. The tunnel body includes a liner layer, a structural layer and an outer protective layer from inside to outside in the radial direction. The liner layer includes a flame-retardant resin and a flame-retardant fabric. The structural layer at least includes a plurality of bamboo strip layers including winding bamboo strips to which a water-soluble resin is adhered. The outer protective layer at least includes flame-retardant resin; and the support component is secured to an inner surface of the tunnel body.

11 Claims, 2 Drawing Sheets

Figure 1:
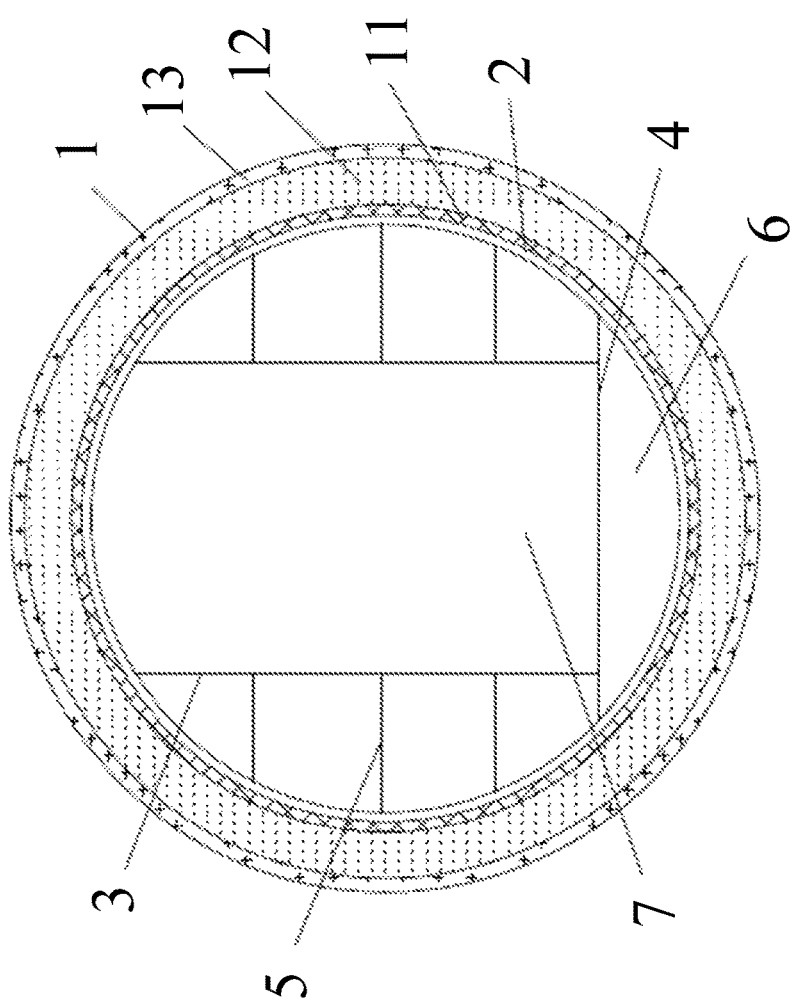

(51) Int. Cl.
 *E02D 29/00* (2006.01)
 *F16L 9/16* (2006.01)
 *F16L 57/04* (2006.01)
(52) U.S. Cl.
 CPC ...... *F16L 57/04* (2013.01); *E02D 2300/0071* (2013.01); *E02D 2300/0075* (2013.01)
(58) Field of Classification Search
 USPC ..................................... 405/134, 150.1, 151
 See application file for complete search history.

(56) References Cited

FOREIGN PATENT DOCUMENTS

| | | | | |
|---|---|---|---|---|
| CN | 201434160 | * | 3/2010 | |
| CN | 203798263 | * | 8/2014 | |
| CN | 204083574 | U | 1/2015 | |
| CN | 105042213 | A | 11/2015 | |
| CN | 205136858 | U | 4/2016 | |
| CN | 206545226 | * | 10/2017 | |
| CN | 206545227 | * | 10/2017 | |
| WO | WO-2017133320 A1 | * | 8/2017 | ................ F16L 9/14 |

* cited by examiner

PREFABRICATED BAMBOO COMPOSITE UTILITY TUNNEL

CROSS-REFERENCE TO RELATED APPLICATIONS

This application is a continuation-in-part of International Patent Application No. PCT/CN2016/090573 with an international filing date of Jul. 20, 2016, designating the United States, now pending, and further claims foreign priority to Chinese Patent Application No. 201520689829.7 filed Sep. 8, 2015. The contents of all of the aforementioned applications, including any intervening amendments thereto, are incorporated herein by reference. Inquiries from the public to applicants or assignees concerning this document or the related applications should be directed to: Mathias Scholl P.C., Attn.: Dr. Matthias Scholl Esq., 245 Fisher Street, 18th Floor, and Cambridge Mass. 02142

BACKGROUND OF THE INVENTION

Field of the Invention

The invention relates to a prefabricated bamboo composite utility tunnel.

Description of the Related Art

Composite utility tunnels are widely used for laying municipal underground pipelines. Conventionally, the composite utility tunnels employ a reinforced concrete structure. They may be prefabricated or cast on-site. However, the conventional manufacturing process is laborious, costly, and relatively long, and the properties of the produced reinforced concrete structure leave much to be desired, especially in terms of leakage rates and ability to withstand tectonic movements.

SUMMARY OF THE INVENTION

In view of the above-described problems, it is one objective of the invention to provide a prefabricated bamboo composite utility tunnel comprising prefabricate tunnel units made of eco-friendly recyclable bamboos. The bamboo composite utility tunnel features high strength, light weight, low material cost, low leakage rates, and good ability to withstand tectonic movements.

To achieve the above objective, in accordance with one embodiment of the invention, there is provided a prefabricated bamboo composite utility tunnel. The prefabricated bamboo composite utility tunnel has a circular cross section, and comprises a plurality of prefabricated tunnel units which are connected to one another. Each tunnel unit comprises a tunnel body and a support component. The tunnel body comprises a liner layer, a structural layer and an outer protective layer from inside to outside in a radial direction. The liner layer comprises flame-retardant resin and flame-retardant fabric. The structural layer comprises at least a plurality of bamboo strip layers which are made by winding bamboo strips comprising a water-soluble resin. The outer protective layer comprises at least a flame-retardant resin. The support component is secured to an inner surface of the tunnel body.

Compared to the prior art, the bamboo composite utility tunnel of the invention innovatively uses bamboos as main reinforcing materials. Bamboos are eco-friendly and recyclable. Therefore, the prefabricated composite utility tunnel is low in production cost and energy-saving and eco-friendly during the production process. In addition, due to the excellent elasticity modulus of bamboos, the prefabricated composite utility tunnel has strong anti-deformation ability and is better than the reinforced concrete structure in terms of anti-seismic performance and subsidence-resistant performance. Therefore, the prefabricated composite utility tunnel has a lower requirement on foundation strength and reduces the amount of work. In addition, the light weight of the prefabricated composite utility tunnel facilitates the construction. The prefabricated tunnel units are connected to form a long municipal pipeline thus saving the labor consumption, simplifying the construction, shortening the construction period, and reducing the cost. The prefabricated composite utility tunnel can be used for the underground composite utility tunnel structure as substitute for the reinforced concrete structure. Specifically, the tunnel body of the tunnel unit employs flame-retardant resin and flame-retardant fabric to prepare the liner layer to form a smooth, waterproof and corrosion-resistant inner wall of the tunnel. The outer protective layer made of flame-retardant resin protects the inner structure so that the outer surface of the tunnel is waterproof, corrosion-resistant and leakage-reducing.

Moreover, since the liner layer, the structural layer and the outer protective layer all adopt flame-retardant resin or nonflammable resin and the fabric of the liner layer is flame-retardant, and the entire tunnel is fire-proof. The support component and other interior structural connectors are disposed on the inner surface of the tunnel to guarantee enough supporting force for other interior structures. The whole tunnel unit is strong in corrosion resistance, good in leakage-reducing and waterproof performance, strong in seismic resistance and good in fire prevention, and has a steady structure and a long service life. Then connecting the prefabricated tunnel units to form a composite utility tunnel can reduce the amount of work, facilitate construction, shorten the construction period, and lower costs.

In a class of this embodiment, the tunnel body comprises a vertical support beam, a horizontal support beam and a tunnel support. The vertical support beam and the horizontal support beam are positioned on a plane perpendicular to the axial direction of the tunnel body. The vertical support beam, the horizontal support beam and the tunnel support are each connected to the support component. The vertical support beam and the horizontal support beam are disposed in the inside of the tunnel body to support the tunnel body horizontally and vertically so as to make the whole structure steady and durable and extend the service life of the composite utility tunnel.

In a class of this embodiment, the horizontal support beam is positioned below an axis of the tunnel body. A plurality of parallel horizontal support beams is disposed on the same plane along the axial direction of the tunnel body. Connecting rods are disposed between the plurality of parallel horizontal support beams and between the horizontal support beams of different tunnel units. A cover plate is disposed on the connecting rods and the plurality of horizontal support beams. The cover plate comprises grids. A drain is disposed under the cover plate. The structure guarantees the horizontal supporting force and can also be used to form a support baseboard for people and vehicle to pass through. The grids disposed on the cover plate allow the leakage water from the tunnel body inside the composite utility tunnel to flow through the grids to the place under the cover plate. The drain disposed under the cover plate can discharge the water directly.

In a class of this embodiment, the support component, the vertical support beam, the horizontal support beams, the tunnel support, the cover plates and the connecting rods are each made out of stainless steel. Therefore, the support component, the vertical support beams, the horizontal support beams, the tunnel support, the cover plates and the connecting rods are high in rigidity, durable and excellent in corrosion resistance and have a long service life.

In a class of this embodiment, two vertical support beams are disposed on the same plane and are perpendicular to the axial direction of the tunnel body. The two vertical support beams are disposed on two inner sides of the tunnel body. A plurality of vertical support beams is disposed in parallel along the axial direction of the tunnel body. A maintenance passage is formed between two face-to-face vertical support beams. The vertical support beam and the support component are connected by tunnel supports on the two sides of the tunnel. The structure can take full advantage of the inner space of the composite utility tunnel, with the maintenance passage disposed in the middle part and the tunnel supports disposed on the two sides to facilitate maintenance.

In a class of this embodiment, the water-soluble resin of the bamboo strip layer is a water-soluble amino resin. The water-soluble resin has very good affinity with plants. Due to the stable combinability of water-soluble resin and bamboos, the structural layer has a high strength, good quality and a long service life.

In a class of this embodiment, the support component is circular. The support component is secured to the inner surface of the tunnel body through bonding. Gluing the round ring-shaped support component and the inner surface of the tunnel together can save materials and guarantee that the connection is firm and strong.

In a class of this embodiment, a stainless-steel jacket is disposed at the position of the outer surface of the tunnel whose corresponding position at the inner surface of the tunnel connects with the support component. Therefore, the tunnel wall strength of the force-bearing point can be further reinforced and the structure becomes steadier and more durable.

In a class of this embodiment, the tunnel units are connected to one another via flange connection or sleeve connection. Adopting the flange connection method or the sleeve connection method can connect direct tubular tunnel units steadily. Therefore, tunnel units only need to be processed into a straight tubular shape so as to facilitate processing and save production time.

In a class of this embodiment, the structural layer also comprises a sand-resin layer which is a mixture of ore sand and resin. The sand-resin layer is positioned between the bamboo strip layers. Adding the sand-resin layer at the structural layer can further increase the tunnel wall rigidity.

DETAILED DESCRIPTION OF THE EMBODIMENTS

Figure 2:
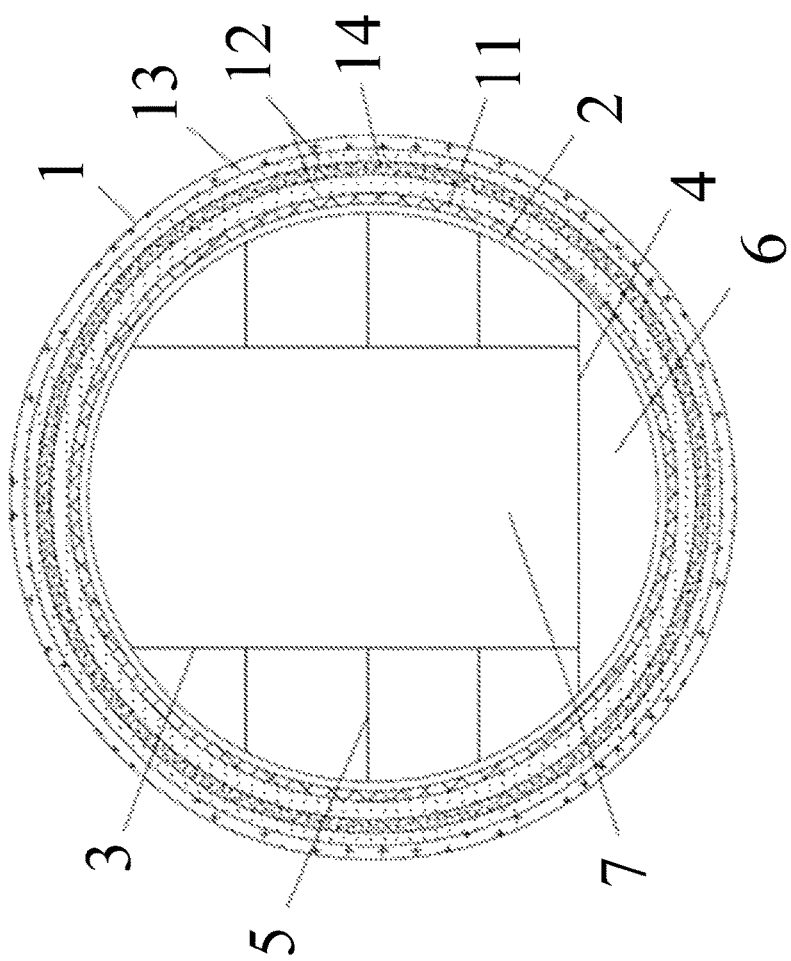

FIG. 1 is a cross section of a prefabricated bamboo composite utility tunnel according to Example 1 of the invention; and FIG. 2 is a cross section of a prefabricated bamboo composite utility tunnel according to Example 2 of the invention.

In the drawings, the following reference numbers are used: 1. Tunnel body; 11. Liner layer; 12. Structural layer; 13. Outer protective layer; 14. Sand-resin layer; 2. Support component; 3. Vertical support beam; 4. Horizontal support beams; 5. Tunnel support; 6. Drain; 7. Maintenance passage.

DETAILED DESCRIPTION OF THE EMBODIMENTS

For further illustrating the invention, experiments detailing a prefabricated bamboo composite utility tunnel are described below. It should be noted that the following examples are intended to describe and not to limit the invention.

EXAMPLE 1

An embodiment of a prefabricated bamboo composite utility tunnel of the invention is shown in FIG. 1. FIG. 1 is a structural diagram of the cross section of a prefabricated bamboo composite utility tunnel The composite utility tunnel has a circular cross section, and is formed by connecting a plurality of tunnel units. The tunnel unit comprises a tunnel body 1 and a support component 2. The tunnel body 1 comprises a liner layer 11, a structural layer 12 and an outer protective layer 13 from inside to outside in the radial direction. The liner layer 11 and the outer protective layer 13 are both used for protecting the structural layer 12, guaranteeing the waterproof, leakage-reducing and corrosion-resistant properties of the tunnel body 1 and extend the service life of the tunnel body. The structural layer 12 is an important reinforcing structure of the tunnel body 1. The liner layer 11 comprises flame-retardant resin and flame-retardant fabric. The flame-retardant resin of the liner layer can be waterproof and corrosion-resistant resin such as vinyl ester resin and epoxy resin. Fillings like curing agents can also be added to the resin thereof. The flame-retardant fabric can be flame-retardant nonwoven fabric, mesh fabric and knitted felt. The outer protective layer 13 comprises at least flame-retardant resin. The flame-retardant resin of the outer protective layer can be waterproof and corrosion-resistant resin such as vinyl ester resin and epoxy resin. Fillings such as curing agents and dyes can also be added to the resin thereof. The structural layer 12 comprises at least a plurality of bamboo strip layers which are made by winding bamboo strips comprising water-soluble resin. The preferred water-soluble resin of the bamboo strip layer is water-soluble amino resin because the combinability of water-soluble amino resin and bamboo strips is the best. Since the structural layer 12 is made of bamboo strips, the tunnel body 1 and the production process of the tunnel body 1 are eco-friendly. While guaranteeing the strength, the tunnel is light and convenient to be transported and installed. Moreover, bamboos are renewable resources and are low in cost. The resin used by the liner layer 11 and outer protective layer 13 of the tunnel body 1 is flame-retardant resin; and the resin used by the structural layer 12 is water-soluble amino resin which is highly flame-retardant resin and can reach the flame-retardant level A. Therefore, the whole tunnel body 1 has very good fireproof performance. The support component 2 is fixed on the inner surface of the tunnel body 1 to support and connect the inner structural components to provide enough bearing force for connecting inner structural components with the tunnel body 1.

The support component 2 can adopt any shape as long as the shape can improve the force-bearing capacity. However, in order to save materials, guarantee firm connection between the support component 2 and the tunnel body 1 and facilitate the processing and application, the preferred shape of the support component is circular. The round ring-shaped support component 2 can be an integrated component or a split-type component. The split-type support component 2 is circular formed by connecting a plurality of arc-shaped components. In the embodiment, the support component 2 is circular. The fixation method for fixing the support component on the inner force of the tunnel can be burying the support component in the liner layer in advance or gluing the support component on the inner surface of the tunnel. Since the gluing method is easy and firm, the preferred method is the gluing method. Adhesives such as epoxy resin and rubber resin can be used for fixing the support component on the inner force of the tunnel and the fixation is completed after the curing of the adhesives. Vertical support beams 3, horizontal support beams 4 and tunnel supports 5 are disposed in the inside of the tunnel body 1. The vertical support beam 3 and the horizontal support beam 4 are positioned on the plane which is perpendicular to the axial direction of the tunnel body 1 to support the tubular tunnel body 1 vertically and horizontally so that the tunnel can be used safely and firmly for a long time. The vertical support beam 3, the horizontal support beam 4 and the tunnel supports 5 all connect with the support component 2. In the embodiment, the horizontal support beam 4 is positioned under the center of the circular cross section of the tunnel body 1. A plurality of horizontal support beams is disposed on the same plane along the axial direction of the tunnel body 1. Connecting rods are disposed between the parallel horizontal support beams 4 and between the horizontal support beams 4 of different tunnel units. Cover plates are laid down on the connecting rod and the horizontal support beam 4. A grid is disposed on the cover plate to form a support baseboard for people to pass through. A drain 6 is disposed under the cover plate. A grid is disposed on the cover plate so that ponding in the composite utility tunnel (for example, leaked water from the tunnel) can leak to the drain 6 through the grid and then be discharged.

In the embodiment, one end of the vertical support beam 3 connects with the support component 2 and the other end of the vertical support beam connects with the horizontal support beam 4. Two vertical support beams 3 are disposed on the same plane and are perpendicular to the axial direction of the tunnel body 1. The two vertical support beams are disposed on the two inner sides of the tunnel body 1. A plurality of vertical support beams 3 is disposed in parallel along the axial direction of the tunnel body 1. A maintenance passage 7 is formed between the two rows of vertical support beams 3 which are disposed face to face. The vertical support beam 3 and the support component 2 are connected by the tunnel supports 5 on the two inner sides of the tunnel body 1. One end of the tunnel supports 5 connects with the support component 2 and the other end of the tunnel support connects the vertical support beam 3 so as to erect a tunnel. In order to facilitate tunnel erection, the vertical support beams 3 are connected section by section from bottom to top; when every section of the vertical support beams 3 is connected, a layer of tunnel supports 5 is connected horizontally between the vertical support beams and the support component 2; the tunnel that needs to be laid on the tunnel supports 5 is erected; then the vertical support beam 3 and the tunnel supports 5 of the upper layer are connected until the top of the tunnel body 1. The preferred horizontal support beam 4, the preferred vertical support beam 3, the preferred tunnel supports 5, the preferred support component 2, the preferred cover plate and the preferred connecting rod are each made of stainless steel, are good in corrosion resistance, have a long service life and feature high rigidity. The bolted connection method or the welding method can be adopted for connecting the support component 2 with the horizontal support beam 4, the vertical support beam 3 and the tunnel supports 5, connecting the horizontal support beam 4 with the vertical support beam 3 and connecting the tunnel supports 5 and the vertical support beam 3.

The tunnel body 1, the support component 2, the vertical support beam 3, the horizontal support beam 4 and the tunnel supports 5 are assembled to form the tunnel unit. Then, the assembled tunnel units are connected to form a composite utility tunnel. If the tunnel body 1 has a small caliber and is not suitable for transportation, the tunnel can be produced in a factory and then be assembled in construction site. If the tunnel body 1 has a larger caliber and is not suitable for transportation, the tunnel can be produced on the construction site and assembled on the construction site. Therefore, the transportation time of the production and construction period is saved and the efficiency is improved. The preferred connection method of connecting a plurality of tunnel units to form a composite utility tunnel is the flange connection method or the sleeve connection method. Therefore, the tunnel body 1 only needs to be processed into a straight tubular shape so as to facilitate processing and improve efficiency. After the tunnel units are connected, the horizontal support beams 4 of different tunnel units are connected by connecting rods and the cover plate is laid on the horizontal support beam 4 and the connecting rod. In order to make the baseboard formed by the horizontal support beam 4, the connecting rod and the cover plate firm and steady, the horizontal support beam 4 and the support component 2 can be connected by the vertical support beam 3. In particular, the corresponding position below the position which is above the horizontal support beam 4 and connects the vertical support beam 3 also connects the vertical support beam 3 to increase the bearing capacity of the force bearing point. The tunnels to be put in the composite utility tunnel can be disposed on the tunnel supports 5. The tunnel supports can also be added on the cover plate to support water supply tunnels and reclaimed water. In order to enhance the bearing capacity of the position of the support component 2, the stainless steel jacket can be disposed on the outer surface of the tunnel body 1 corresponding to the position of the support component 2.

The tunnel body 1 can be produced according to the following steps:

1) Preparing the liner layer 11: wind the flame-retardant fabric (for example, nonwoven fabric, mesh fabric and knitted felt) with flame-retardant resin (for example, vinyl ester resin and epoxy resin; fillings like curing agents can also be added to the resin according to specific requirements) around the tunnel mold for a plurality of layers to form the liner layer after curing. In the embodiment, the specific steps are as follows: get flame-retardant epoxy resin, add the curing agent to the epoxy resin in proportion, mix the epoxy resin and the curing agent evenly, get and dip flame-retardant fiberglass felt in the prepared resin, then wind the felt around the tunnel mold for two layers to form the liner layer 11 after curing.

2) Preparing the structural layer 12: make bamboo strips into a continuous shape (for example, aligning the bamboo strips closely, arranging a plurality of lines of bamboo strips longitudinally and sewing the lines of bamboo strips into a continuous bamboo strip belt), roll the bamboo strips into a roll and install the roll onto the winding machine. Add water-soluble resin into the resin tank of the winding machine (fillings like the curing agent can be added to the resin according to specific requirements). In the embodiment, add water-soluble amino resin, mix the resin with the curing agent in proportion and then start the winding operation. Bamboo strips pass through the resin tank to be covered with water-soluble resin, and then are winding around the liner layer 11 in a spiral crossed way or a circular way. The bamboo strips are winding for a plurality of layers to the design thickness and then form the structural layer after curing.

3) Preparing the outer protective layer 13: the structural layer 12 is coated with flame-retardant resin (For example, vinyl ester resin and epoxy resin; fillings like anti-radiation fillings can also be added to the resin according to specific requirements) in certain thickness evenly. After curing, the resin forms the outer protective layer 13.

After the tunnel body 1 is prepared, the inner wall of the tunnel connects with the support component 2. There can be a plurality of connection methods for connecting the inner wall of the tunnel and the support component such as the pre-burying connection method and the direct gluing connection method. If the pre-burying connection method is adopted, the support component 2 is disposed on the tunnel mold before the liner layer 11 is winding; then the liner layer 11 is produced on the surface of the support component 2; and a plurality of fore-bearing components 2 are disposed on the tunnel mold in parallel according to specific requirements. If the direct gluing connection method is adopted, after the tunnel body 1 is produced, the support component 2 is glued to the inner surface of the tunnel body 1 by adhesives like epoxy resin, and a firm connection is formed after the sodification of the adhesives; the tunnel body 1 whose inner surface has a groove matching with the support component 2 can be produced; and the support component is glued to the groove by adhesives to form a firmer connection. The support component 2 can adopt any shape. In the embodiment, the support component adopts a round ring shape and can have a plurality of sections. Gluing sections of the support component section by section finally forms a complete round ring-shaped support component 2 which is glued to the inner service of the tunnel body 1. When the support component 2 is circular, for further strengthening the bearing capacity of the tunnel wall, preferably, a stainless steel jacket is disposed at the corresponding position of the outer surface of the tunnel after the tunnel body 1 connects with the support component 2.

EXAMPLE 2

Another embodiment of a prefabricated bamboo composite utility tunnel of the invention is shown as FIG. 2. FIG. 2 is a structural diagram of the cross section of a prefabricated bamboo composite utility tunnel In the embodiment, the structural layer 12 further comprises a sand-resin layer 14 which is a mixture of ore sand and resin. The sand-resin layer 14 is positioned between bamboo strip layers. Arranging the sand-resin layer 14 between the bamboo strip layers can increase the rigidity of the tunnel body 1. When the structural layer 11 comprises the sand-resin layer 14, the method for producing the structural layer 11 is that: ore sand is evenly mixed (for example, silica sand) with resin (for example, epoxy resin) to form sand resin; then, when bamboo strips are winding, the bamboo strips are sprinkled with sand resin to the sand resin is winding as the bamboo strips are winding for a plurality of layers according to requirements; when there is no need to continue to wind the sand-resin layer 14, what only needs to be done is to stop spraying. In the embodiment, ore sand whose weight accounts for 80% of the weight of the sand resin and resin whose weight accounts for 20% of the weight of the sand resin are mixed evenly to produce the sand resin.

The prefabricated bamboo composite utility tunnels in Examples 1 and 2 of the invention are produced by winding bamboos, and are eco-friendly and renewable. The winding method can give play to the tensile strength and modulus of elasticity. Therefore, the tunnel has the advantages that the produced composite utility tunnel has high strength; the tunnel wall has no flaw stress distribution; the composite utility tunnel has strong anti-deformation ability, is excellent in anti-seismic performance and subsidence-resistant performance, low in cost, light in weight, high in production efficiency and easy to install.

The inner structure of the tunnel units can be adjusted according to actual requirements. FIGS. 1 and 2 just provide an example.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A composite utility tunnel, comprising a plurality of prefabricated tunnel units, each of the plurality of prefabricated tunnel units comprising:
   a tunnel body, the tunnel body comprising a liner layer, a structural layer, and an outer protective layer; the liner layer comprising a first flame-retardant resin and a flame-retardant fabric; the structural layer comprising at least a plurality of bamboo strip layers, the plurality of bamboo strip layers comprising winding bamboo strips; and the outer protective layer comprising at least a second flame-retardant resin; and
   a support component;
wherein:
   the plurality of prefabricated tunnel units are connected to one another;
   the liner layer, the structural layer, and the outer protective layer are arranged from inside to outside of the tunnel body in a radial direction;
   a water-soluble resin is adhered to the winding bamboo strips;
   the support component is secured to an inner surface of the tunnel body;
   the tunnel body further comprises a plurality of vertical support beams, a plurality of horizontal support beams, and a plurality of tunnel supports;
   the plurality of vertical support beams and the plurality of horizontal support beams are positioned on a plane perpendicular to an axial direction of the tunnel body; and
   the plurality of vertical support beams, the plurality of horizontal support beams and the plurality of tunnel supports are connected to the support component.

2. The utility tunnel of claim 1, wherein the plurality of horizontal support beams are positioned below an axis of the tunnel body; the plurality of horizontal support beams are disposed in parallel on a plane along the axial direction of the tunnel body; connecting rods are disposed between the plurality of horizontal support beams on the plane and between the plurality of horizontal support beams of adjacent ones of the plurality of prefabricated tunnel units; a cover plate is disposed on the connecting rods and the plurality of horizontal support beams; the cover plate comprises grids; and a drain is disposed under the cover plate.

3. The utility tunnel of claim 2, wherein the support component, the plurality of vertical support beams, the plurality of horizontal support beams, the plurality of tunnel supports, the cover plate, and the connecting rods are each stainless steel.

4. The utility tunnel of claim 2, wherein two of the plurality of vertical support beams are disposed on the plane perpendicular to the axial direction of the tunnel body; the two of the plurality of vertical support beams are disposed on two inner sides of the tunnel body; the plurality of vertical support beams are disposed in parallel along the axial direction of the tunnel body; a maintenance passage is formed between two face-to-face vertical support beams of the plurality of vertical support beams; and the plurality of tunnel supports are disposed on the two inner sides of the tunnel body to connect the plurality of vertical support beams and the support component.

5. The utility tunnel of claim 1, wherein the support component, the plurality of vertical support beams, the plurality of horizontal support beams, the plurality of tunnel supports, the cover plate, and the connecting rods are each stainless steel.

6. The utility tunnel of claim 1, wherein two of the plurality of vertical support beams are disposed on the plane perpendicular to the axial direction of the tunnel body; the two of the plurality of vertical support beams are disposed on two inner sides of the tunnel body; the plurality of vertical support beams are disposed in parallel along the axial direction of the tunnel body; a maintenance passage is formed between two face-to-face vertical support beams of the plurality of vertical support beams; and the plurality of tunnel supports are disposed on the two inner sides of the tunnel body to connect the plurality of vertical support beams and the support component.

7. The utility tunnel of claim 1, wherein the water-soluble resin of the bamboo strip layer is a water-soluble amino resin.

8. The utility tunnel of claim 1, wherein the support component is circular.

9. A composite utility tunnel, comprising a plurality of prefabricated tunnel units, each of the plurality of prefabricated tunnel units comprising:
   a tunnel body; the tunnel body comprising a liner layer, a structural layer, and an outer protective layer; the liner layer comprising a first flame-retardant resin and a flame-retardant fabric; the structural layer comprising at least a plurality of bamboo strip layers, the plurality of bamboo strip layers comprising winding bamboo strips; and the outer protective layer comprising at least a second flame-retardant resin; and
   a support component
wherein:
   the plurality of prefabricated tunnel units are connected to one another;
   the liner layer, the structural layer, and the outer protective layer are arranged from inside to outside of the tunnel body in a radial direction;
   a water-soluble resin is adhered to the winding bamboo strips;
   the support component is circular and is secured to an inner surface of the tunnel body; and
   a stainless-steel jacket is disposed on an outer surface of the tunnel body and is corresponding to the support component on the inner surface of the tunnel body.

10. The utility tunnel of claim 9, wherein the tunnel units are connected to one another via flange connection or sleeve connection.

11. A composite utility tunnel, comprising a plurality of prefabricated tunnel units, each of the plurality of prefabricated tunnel units comprising:
   a tunnel body, the tunnel body comprising a liner layer, a structural layer, and an outer protective layer; the liner layer comprising a first flame-retardant resin and a flame-retardant fabric; the structural layer comprising at least a plurality of bamboo strip layers, the plurality of bamboo strip layers comprising winding bamboo strips; the structural layer further comprising a sand-resin layer comprising ore sand and resin; and the outer protective layer comprising at least a second flame-retardant resin; and
   a support component
wherein:
   the plurality of prefabricated tunnel units are connected to one another;
   the liner layer, the structural layer, and the outer protective layer are arranged from inside to outside of the tunnel body in a radial direction;
   a water-soluble resin is adhered to the winding bamboo strips;
   the support component is secured to an inner surface of the tunnel body; and
   the sand-resin layer is distributed between the plurality of bamboo strip layers.

\* \* \* \* \*